United States Patent
Chng et al.

(10) Patent No.: US 6,728,054 B2
(45) Date of Patent: Apr. 27, 2004

(54) DRIVE WITH ADAPTIVE DATA FORMAT AND HEAD SWITCH SEQUENCING

(75) Inventors: Yong Peng Chng, Singapore (SG); Steven Tian Chye Cheok, Singapore (SG); Patrick Tai Heng Wong, Singapore (SG); Ricky Wei Watt Yeo, Singapore (SG); Wesley Wing Hung Chan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 351 days.

(21) Appl. No.: 09/999,329

(22) Filed: Oct. 31, 2001

(65) Prior Publication Data

US 2002/0101675 A1 Aug. 1, 2002

Related U.S. Application Data

(60) Provisional application No. 60/264,894, filed on Jan. 29, 2001.

(51) Int. Cl.$^7$ ................................................ G11B 15/12
(52) U.S. Cl. .............................. 360/63; 360/75; 360/76
(58) Field of Search ........................... 360/63, 48, 72.1, 360/31, 75, 76, 61, 78.04, 78.08; 324/210, 212

(56) References Cited

U.S. PATENT DOCUMENTS

| | | | |
|---|---|---|---|
| 5,187,620 A | 2/1993 | Notake et al. | |
| 5,193,036 A | 3/1993 | Green et al. | |
| 5,196,970 A | 3/1993 | Seko et al. | |
| 5,202,799 A | 4/1993 | Hetzler et al. | |
| 5,255,136 A | 10/1993 | Machado et al. | |
| 5,280,603 A | 1/1994 | Jeppson et al. | |
| 5,293,565 A | 3/1994 | Jaquette et al. | |
| 5,523,903 A | 6/1996 | Hetzler et al. | |
| 5,583,712 A | 12/1996 | Brunelle | |
| 5,760,993 A | 6/1998 | Purkett | |
| 5,835,299 A | 11/1998 | Lee et al. | |
| 5,872,673 A | 2/1999 | Purkett | |
| 5,978,170 A | 11/1999 | Izumiya et al. | |
| 6,034,837 A | 3/2000 | Purkett | |
| 6,105,104 A | 8/2000 | Guttmann et al. | |
| 6,424,485 B1 * | 7/2002 | Enokida et al. | ................ 360/76 |

* cited by examiner

*Primary Examiner*—Alan T. Faber
(74) *Attorney, Agent, or Firm*—Merchant & Gould P.C.

(57) ABSTRACT

A system for adapting head switching sequence in a disc drive includes a method of measuring the time duration for a head switch operation and the time duration of a track switch operation. The system compares the two time durations to determine whether head switching or track switching should be utilized within a zone of tracks on the surface of the data disc. Track switch time durations and head switch time durations may be averaged within a zone and the averages compared to determine whether to use head switching or track switching.

16 Claims, 7 Drawing Sheets

DRIVE WITH ADAPTIVE DATA FORMAT AND HEAD SWITCH SEQUENCING

RELATED APPLICATIONS

This application claims priority of U.S. provisional application Ser. No. 60/264,894 filed Jan. 29, 2001.

FIELD OF THE INVENTION

This application relates generally to computer disc drives and more particularly to adaptive data format and head switch sequencing in a drive control system.

BACKGROUND OF THE INVENTION

Disc drives enable users of modern computer systems to store and retrieve vast amounts of data in a fast and efficient manner. A typical disc drive houses a number of circular, magnetic discs (such as one to ten) which are axially aligned and rotated by a spindle motor at a constant, high speed (such as 10,000 revolutions per minute). As the discs are rotated, an actuator assembly moves an array of read/write heads over the surfaces of the discs to store and retrieve the data from tracks defined on the surfaces of the discs.

A closed loop digital servo control system is typically used to control the position of the heads relative to the tracks. The servo system generates a signal indicative of the position of the heads. In response to the detected position, the servo system outputs current to an actuator motor (such as a voice coil motor, or VCM) utilized to pivot the actuator assembly, and hence the heads, across the disc surfaces. The heads are positioned over a set of substantially circular tracks of data on the data discs. The multiple tracks are axially aligned and form what are known in the industry as cylinders. A common method of addressing into data discs is by using physical cylinder head sector (PCHS) addressing.

It is a continuing trend in the disc drive industry to provide successive generations of disc drive products with ever increasing data storage capacities and data transfer rates. Because the amount of disc surface area available for the recording of data remains substantially constant (or even decreases as disc drive form factors become smaller), substantial advancements in areal recording densities, both in terms of the number of bits that can be recorded on each track as well as the number of tracks on each disc, are continually being made in order to facilitate such increases in data capacity.

Ideally, the read/write heads are perfectly aligned, so that when a head switch is made from one head to another, the head is already in the proper track position. However, during the disc drive assembly process, heads are frequently misaligned. When head misalignment occurs, another seek is required after the head switch to properly position the head with respect to the desired track. As a result, head switch times are increased due to the extra seek needed to position the read/write head. With the increasing track density (TPI), if heads are misaligned by 1%, the resulting difference in track position can be large.

The head switch time (with the additional seek) in the worst case, is greater than the time it would take to perform a track switch operation. A track switch operation involves using the current head to get to the desired track rather than switching heads. When a track switch is faster than a head switch, it would be preferable to use a track switch operation. Within the surface of a disc, head switching can be faster than track switching at different areas of the surface.

Thus, it would be desirable to choose dynamically which switching method is utilized depending on where the head is on the surface of the disc. However, current methods of disc drive assembly do not allow for choosing between the two switching methods based on the switching times at different areas on the disc.

Accordingly there is a need for a method of adapting data format and head switching sequence to specific disc drives.

SUMMARY OF THE INVENTION

Embodiments of the present invention improve seek times by adapting switching schemes utilized in an individual disc drive. One embodiment employs a method of selecting a switching scheme for each of a number of zones of a data disc, depending on timing characteristics of the specific disc drive and its data disc or discs. As such, the switching scheme that is used for one disc drive of a particular model of disc drives may be different from the switching scheme used for another disc drive even of the same model.

These and various other features as well as advantages which characterize the present invention will be apparent from a reading of the following detailed description and a review of the associated drawings.

DETAILED DESCRIPTION

Figure 1:
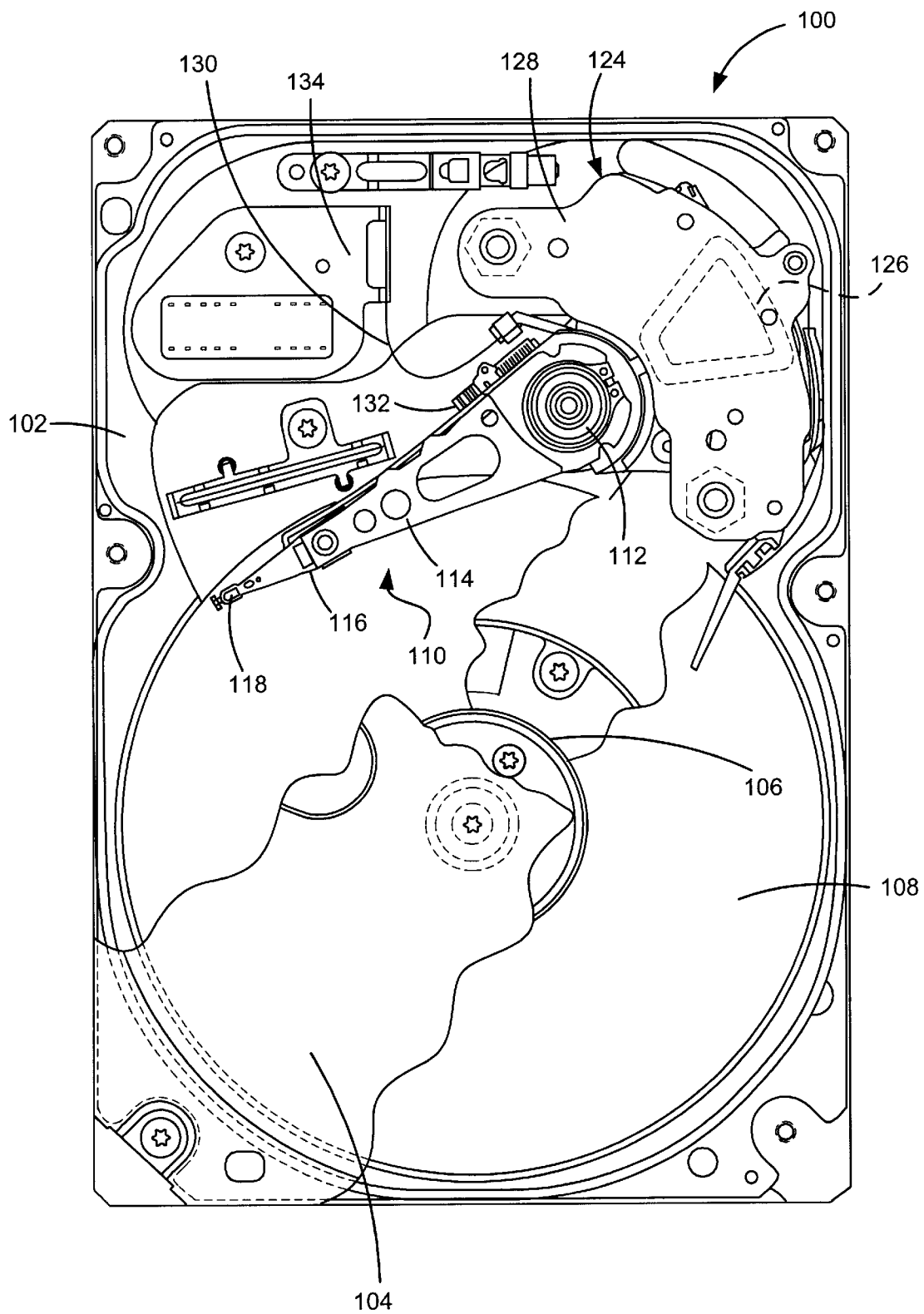
FIG. 1 is a plan view of a disc drive incorporating a preferred embodiment of the present invention showing the primary internal components.

The invention is described in detail below with reference to the drawing figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones (not shown) near the inner diameter of the discs 108 when the drive motor is de-energized. The heads 118 are secured over the park zones (not shown) through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
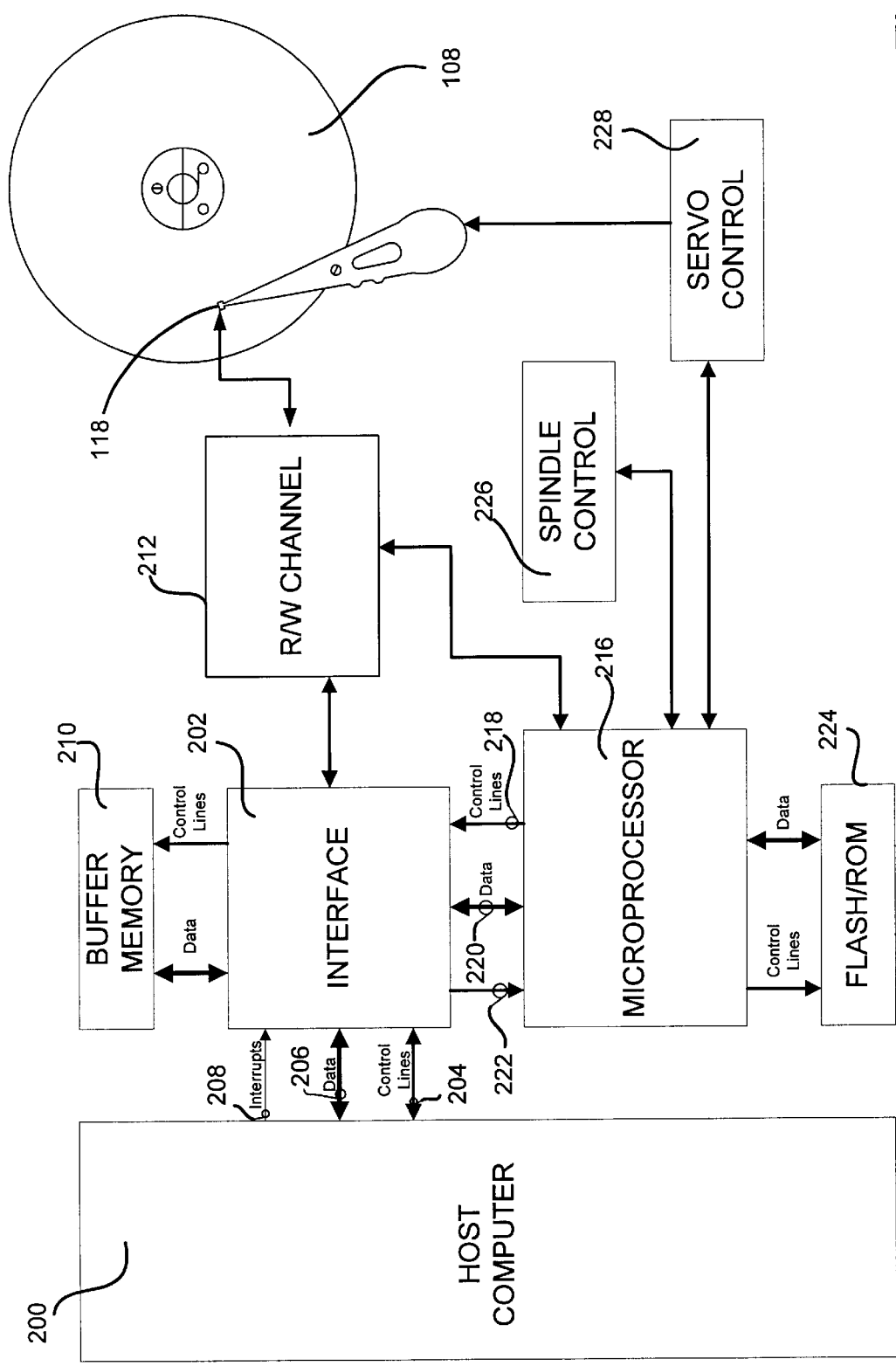
FIG. 2 is a functional block diagram of the disc drive of FIG. 1 in accordance with a preferred embodiment of the present invention.

FIG. 2 is a functional block diagram of the disc drive 100 of FIG. 1, generally showing the main functional circuits which are typically resident on a disc drive printed circuit board and which are used to control the operation of the disc drive 100. As shown in FIG. 2, the host 200 is operably connected to an interface application specific integrated circuit (interface) 202 via control lines 204, data lines 206, and interrupt lines 208. The interface 202 typically includes an associated buffer 210 that facilitates high speed data transfer between the host 200 and the disc drive 100. Data to be written to the disc drive 100 are passed from the host 200 to the interface 202 and then to a read/write channel 212, which encodes and serializes the data.

The read/write channel 212 also provides the requisite write current signals to the heads 118. To retrieve data that has been previously stored by the disc drive 100, read signals are generated by the heads 118 and provided to the read/write channel 212, which processes and outputs the retrieved data to the interface 202 for subsequent transfer to the host 200. Such operations of the disc drive 100 are well known in the art and are discussed, for example, in U.S. Pat. No. 5,276,662 issued Jan. 4, 1994 to Shaver et al.

As also shown in FIG. 2, a microprocessor 216 is operably connected to the interface 202 via control lines 218, data lines 220, and interrupt lines 222. The microprocessor 216 provides top level communication and control for the disc drive 100 in conjunction with programming for the microprocessor 216 which is typically stored in a microprocessor memory (MEM) 224. The MEM 224 can include random access memory (RAM), read only memory (ROM), and other sources of resident memory for the microprocessor 216. Additionally, the microprocessor 216 provides control signals for spindle control 226, and servo control 228.

Figure 3:
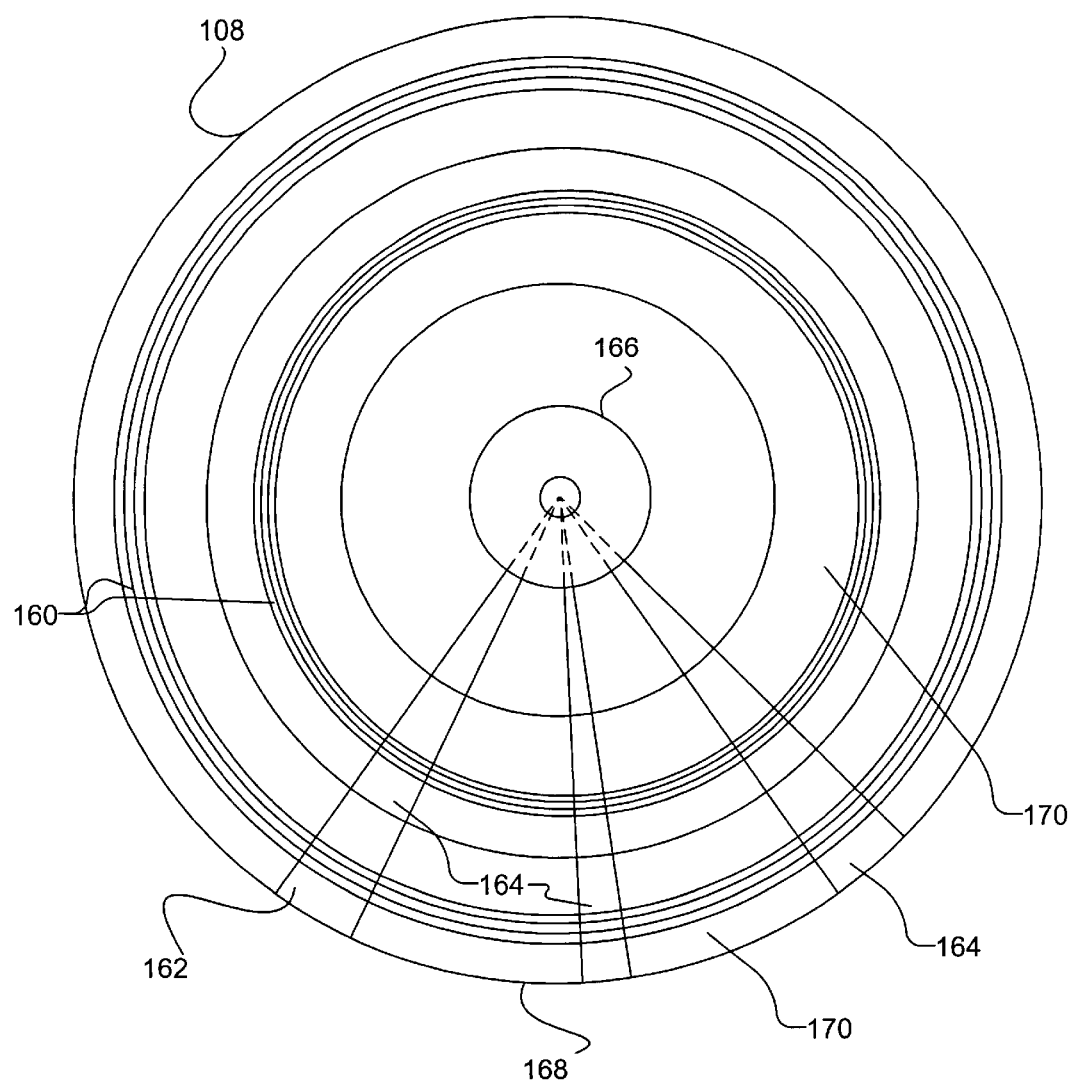
FIG. 3 depicts a plurality of concentric tracks on a disc of the disc drive, illustrating the manner in which data is stored on the disc.

Referring now to FIG. 3, shown therein is a plan view of the disc 108, generally showing the main components on the surface of the disc 108. The discs 108 are circumferentially divided into a plurality of concentric circular tracks 160. The number of tracks 160 per disc 108 will vary with each particular manufactured disc 108. A one-time revolution (INDEX) around each track 160 is typically indicated by an index mark 162 that extends the radius of the disc 108. The tracks 160 are in groups, called zones 170, in which the recording frequency is substantially the same among the tracks 160.

The disc 108 is radially divided into a plurality of servo segments 164. Typically, the servo segments 164 begin near the inner edge 166 of the annular disc 108 and terminate near the outer edge 168 of the disc 108. As with the number of tracks 160 per disc 108, the number of servo segments 164 per disc 108 varies with each particular manufactured disc 108. Each track 160 is composed of spaced servo segments 164 with data sectors between the servo segments 164.

Figure 4:
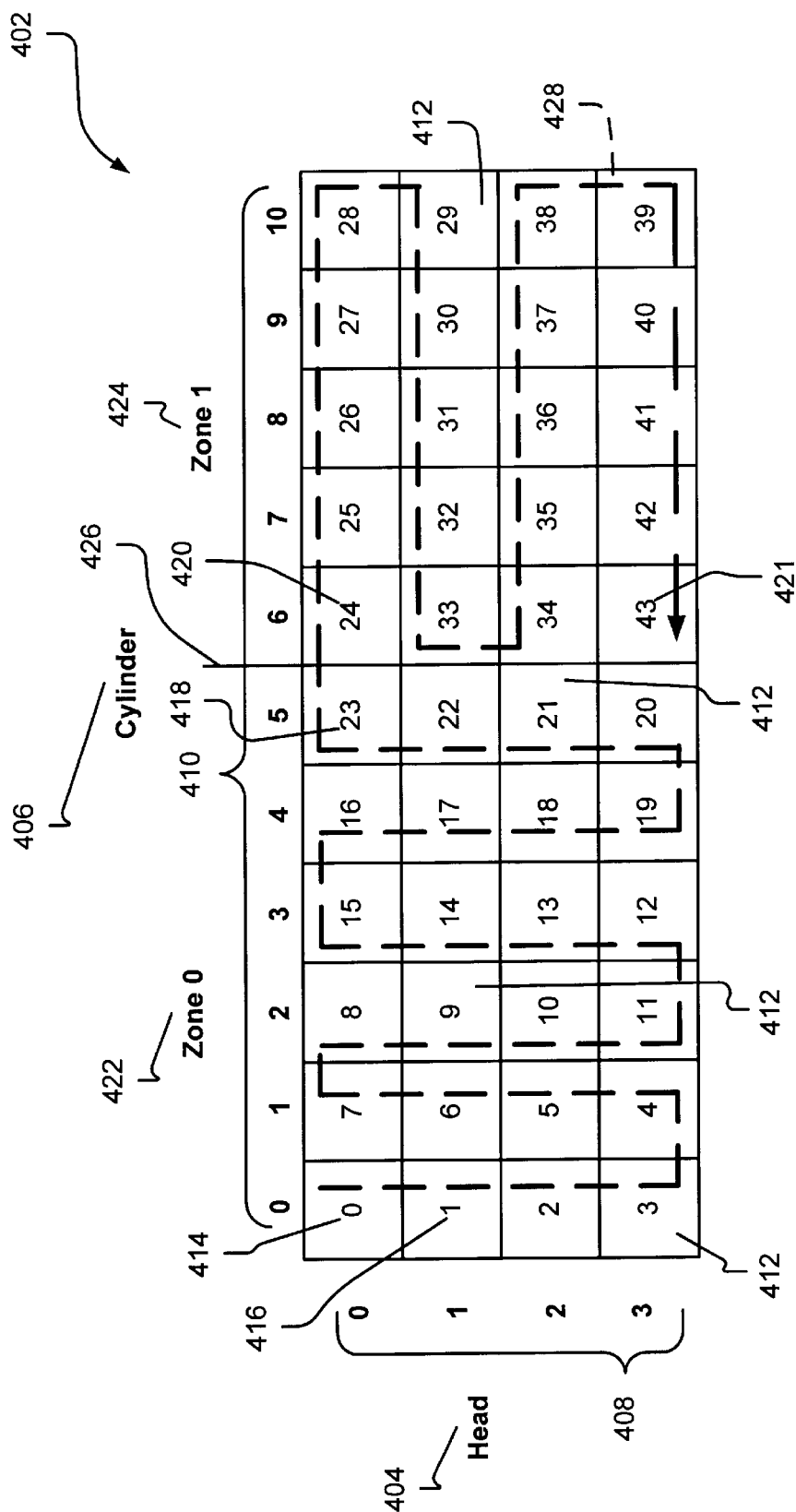
FIG. 4 depicts zones with associated tracks, heads, cylinders, and adapted switching schemes in accordance with an embodiment of the present invention.

FIG. 4 depicts a zone scheme with associated tracks, heads, cylinders, and adapted switching schemes in accordance with an embodiment of the present invention in a drive having two discs 108. Although FIG. 4 illustrates a map 402 of eleven (11) cylinders, it is envisioned that a typical disc drive will include thousands of cylinders. Furthermore, while FIG. 4 illustrates 4 heads, disc drives can include more or fewer heads, depending on the number of disc surfaces.

FIG. 4 is intended to help the reader understand one embodiment of the present invention and is not meant to limit the scope of the invention to any particular disc drive. FIG. 4 may be viewed as a representation of one method of associating tracks with heads, zones, and cylinders. FIG. 4 may further be understood as representing a method of addressing the tracks using head switching or track switching.

The map 402 is shown having a number of rows and columns to map heads 404 to cylinders 406. The heads 404 are each identified by head numbers 408 appearing down the left side of the map 402 as row labels. The cylinders 406 are each identified by cylinder numbers 410 appearing across the top of the map 402 as column labels. At intersections 412 of each column and row is a track number, such as track 0 (414). For example, track 0 (414) is at the intersection of cylinder 0 and head 0. Other examples of track numbers are track 1 (416), track 23 (418), track 24 (420), and track 43 (421). Zone 0 (422) and zone 1 (424) are shown above associated cylinder numbers 410. A boundary line 426 located between cylinder 5 and cylinder 6 indicates that zone 0 (422) includes cylinder 0 through cylinder 5, while zone 1 (424) includes cylinder 6 through cylinder 10. Zone boundaries are typically defined during the disc drive development and may vary in location, depending on disc drive parameters. Therefore, different models of disc drives may have different numbers of zones. Tracks within the same zone have substantially the same recording frequencies.

Thus, the map 402 maps every track number to a head, cylinder, and zone. The map 402 also includes a dashed switching line 428 that illustrates an order of head switches and track switches in this particular embodiment. The switching line 428 begins at track 0 (414) and progresses in a serpentine fashion as shown by the dashed line 428 to track 43 (421). The switching line progresses sequentially through the tracks until the switching line 428 ends at track 43 (421). The switching line 428 progresses through the intersections 412 of the map in either a horizontal fashion (column to adjacent column) or vertical fashion (row to adjacent row). When the switching line 428 progresses vertically from one row to another row, a head switch occurs. When the switching line 428 progresses horizontally from one column to another column, a track switch occurs. For example, when the switching line 428 progresses from track 0 (414) to track 1 (416), a head switch occurs from head 0 to head 1. As another example, when the switching line 428 progresses from track 23 (418) to track 24 (420), a track switch occurs from cylinder 5 to cylinder 6 using head 0.

Thus, a track switching scheme is used in zone 1 (424) and a head switching scheme is used in zone 0 (422). The selection of track switching in zone 1 (424) and head switching in zone 0 (422) is, based on a switching analysis that analyzes how much time is taken to switch among tracks at various locations on the data discs. Because every disc drive even within the same form factor family is different in terms of switching times as a result of subtle physical differences, it is envisioned that a different switching sequence may be generated for each individual disc drive. For example, the switching scheme illustrated in FIG. 4 may be optimal to achieve faster seeks in one disc drive. In another disc drive, track seeks may be faster by using track switching in zone 0 and head switching in zone 1.

FIG. 4 illustrates only two zones. In an actual embodiment, many more zones are envisioned. The map 402 is merely one representation of the switching scheme that can be generated using an embodiment of the present invention. Switching data such as the data included in the map 402, is preferably stored on a memory medium in a binary encode form so that the data can be accessed by a microprocessor. For example, this map may be stored on a reserve track (e.g., 160) on one of the discs in the disc drive. Methods of generating data such as the data shown in the map 402 are illustrated in the following embodiments.

Figure 6:
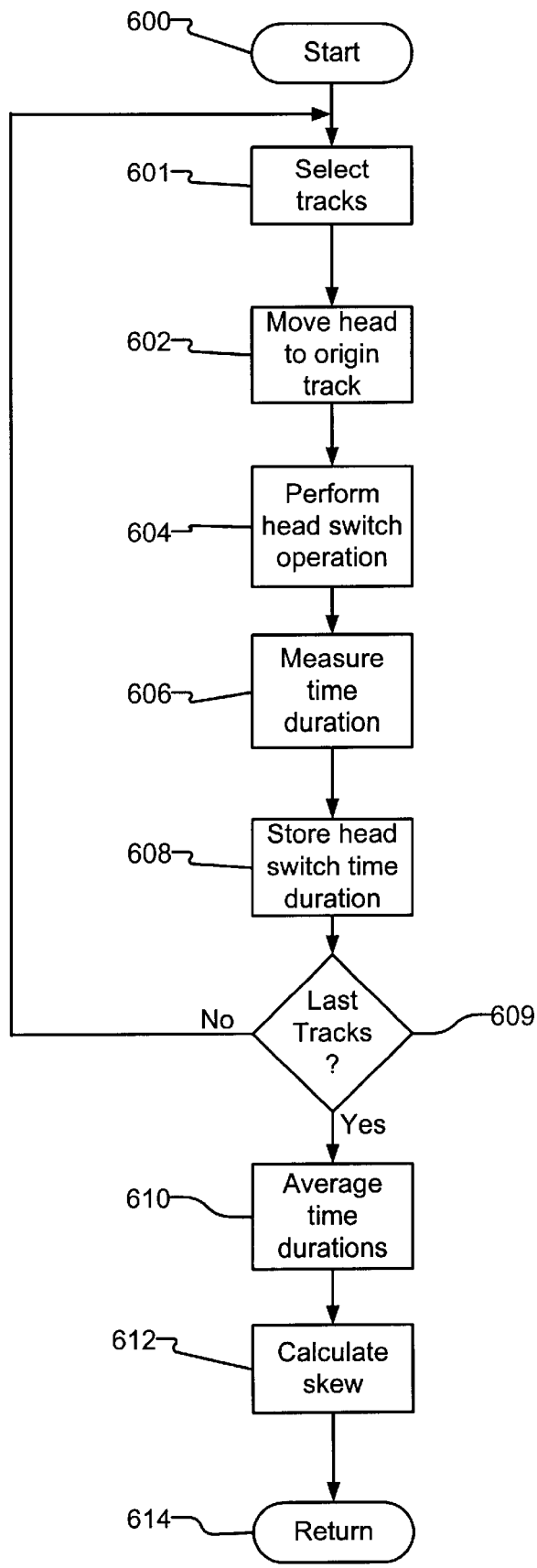
FIG. 6 is a flow diagram illustrating steps of performing a head switch test for adaptive head switch sequencing in accordance with an embodiment of the present invention.
Figure 7:
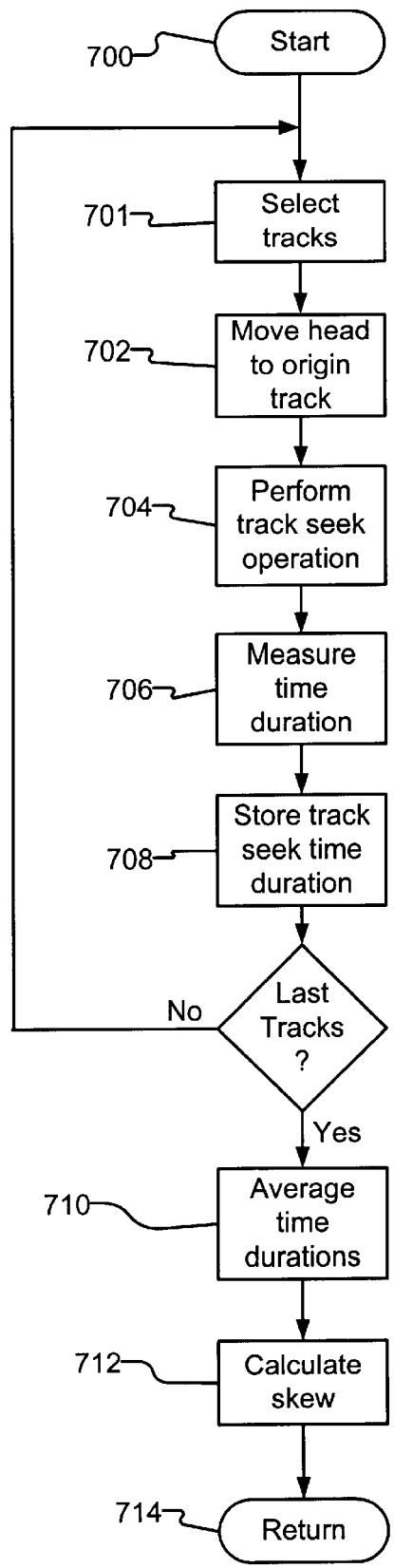
FIG. 7 is a flow diagram illustrating steps of performing a track seek test for adaptive head switch sequencing in accordance with an embodiment of the present invention.

In the previous sections, a system level overview of the operation of an exemplary embodiment of the invention is described. In the following sections, the particular methods performed by a computer executing an exemplary embodiment is described by reference to a series of flowcharts. The methods to be performed by a computer constitute computer programs made up of computer-executable instructions. The computer programs may be executed by the host computer 200 shown in FIG. 2 or incorporated within the servo control microprocessor 216 in the disc drive 100 itself. Describing the methods by reference to a flowchart enables one skilled in the art to develop such programs including such instructions to carry out the methods on suitable computers (the processor of the computers executing the instructions from computer-readable media). The methods are illustrated in FIGS. 5–7 and are inclusive of the steps or acts required to be taken by the disc drive 100 operating in the environment shown in FIG. 2.

Figure 5:
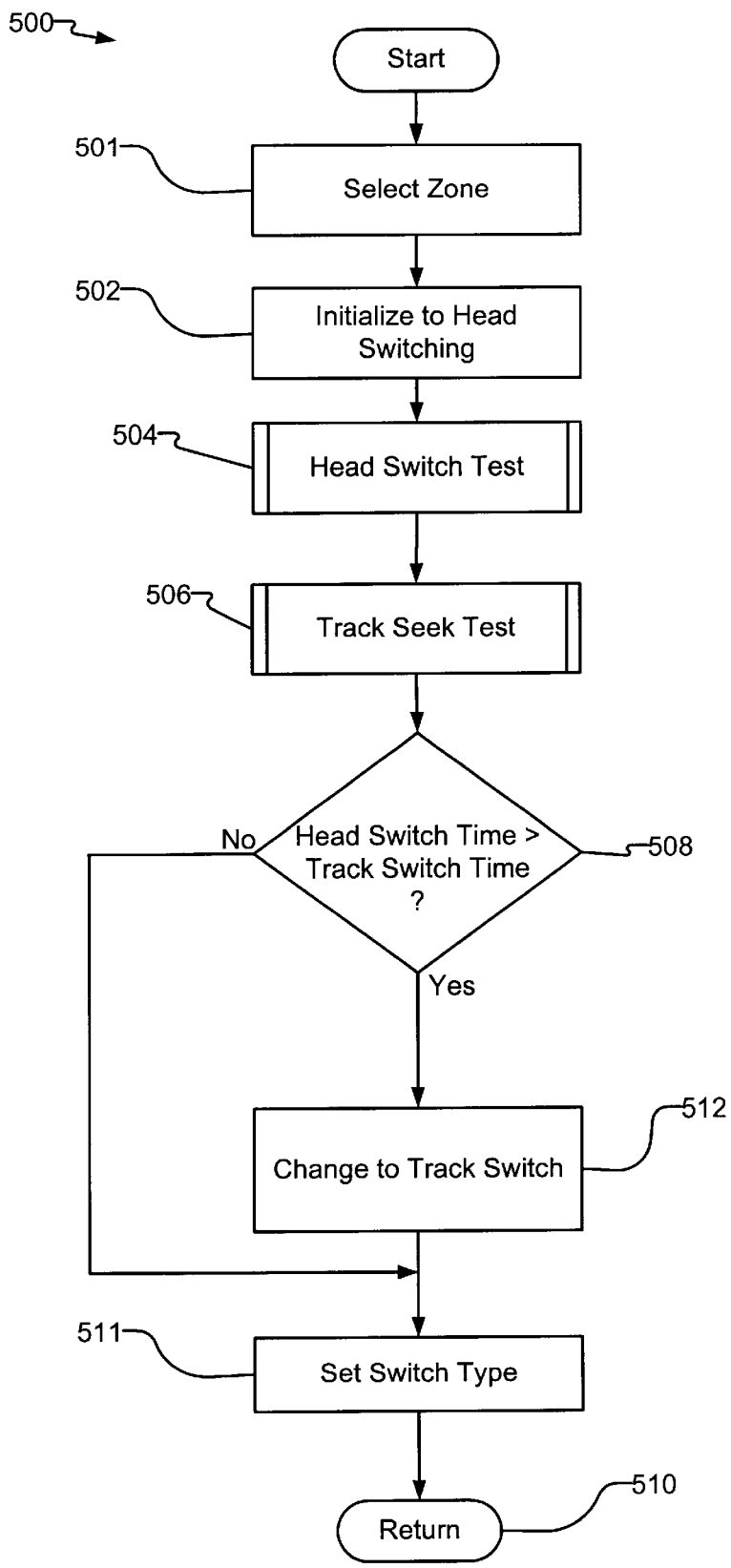
FIG. 5 is a flow diagram illustrating steps of adaptive head switch sequencing and data format in accordance with an embodiment of the present invention.

FIG. 5 is a flow diagram illustrating steps in an adaptive switching scheme 500 in accordance with an embodiment of the present invention. The steps illustrated in FIG. 5 may be executed preferably during a disc drive certification process to choose which switching scheme (head switching or track switching) to use at various locations on the discs. As will be discussed, the switching scheme that is chosen depends on switching times and seek times. Switching times and seek times generally vary among disc drives and regions on data discs. The switching operations are adapted to each disc drive being certified based on switching times at different locations on data discs within the disc drive. Switching time durations can be minimized using the embodiment of the present invention shown in FIG. 5.

The embodiment illustrated in FIG. 5 can be applied to disc drives having any number of data discs, and consequently, any number of disc surfaces. Typically, a disc drive includes one read/write head for each disc surface. For example, if a disc drive has one data disc, there are two readable/writeable disc surfaces, and hence, two read/write heads. By way of illustration, and not limitation, another disc drive may have four data discs and eight readable/writeable disc surfaces, and therefore, eight read/write heads. Head switching generally involves selecting one of the read/write heads at a track on an associated disc surface, and subsequently switching to another read/write head at another track on another associated disc surface. Head switching may be implemented by a command sent from the host computer 200 to the disc drive 100.

A selecting operation 501 selects a zone on the data disc in which to perform the adapting scheme. As was discussed, a data disc typically has a number of zones that each include a number of data tracks. The selecting operation 501 selects one of these zones each time the adaptive switching scheme 500 is executed. Control then transfers to an initializing operation 502 wherein the switching type is initialized to head switching. The initializing operation 502 may set a switching type variable to a value indicating that head switching will be used within the selected zone. Control then transfers to a head switch test operation 504 wherein a head switch test is performed. The head switch test 504 is preferably a software routine wherein a time duration is calculated representing the time taken to switch from one head to another head in the disc drive. The head switch test 504 typically involves issuing a command to the disc drive to seek to another track utilizing a head switching operation. When the command is issued, a timer can be started that counts the time until the head settles on the selected track. The time duration from command issuance until the head settles on the selected track is referred to as a head switch time duration. The head switch time duration will be used later to determine which switching scheme is optimal for the selected zone on the data disc. An embodiment of the head switch test 504 is shown in FIG. 6, and is discussed in more detail below.

Following the head switch test 504, control then transfers to a track switch test 506. In the track switch test 506, a track switch test is performed wherein a time duration is calculated representing the time taken for the initial head to seek and settle on a selected track. In other words, rather than switching heads, the track switch test 506 employs the initial head to obtain the selected track. The track switch time duration will be used later to determine the optimal switching type for the selected zone on the data disc. An embodiment of the track switch test 506 is illustrated in FIG. 7 and is discussed in more detail below. Following the track switch test 506, control transfers to a query operation 508 wherein it is determined whether the previously calculated head switch time duration is greater than the previously calculated track switch time duration. If the head switch time duration is not greater than the track switch time duration, control transfers to the return operation 510. If, in the query operation 508, the head switch time duration is greater than the track switch time duration, control transfers to a change operation 512.

In the change operation 512 the switching type is changed to a track switching. After the change operation 512, control transfers to a setting operation 511. In the setting operation 511, the switch type from either the initializing operation 502 or the changing operation 512 is set to either head switching or track switching for the selected zone (from the selecting operation 501). Setting the switch type may involve storing an indicator in memory that can later be used to indicate which type of switching will be utilized in the selected zone. The adaptive switching scheme 500 may be executed for all the zones on the data disc and a switching type indicator stored in memory for each zone. For example, a table may be stored in memory that associates each zone with a switching type determined by the adaptive switching scheme 500. The table can be stored in memory and accessed during run time to determine the switching type during seek operations. During operation, the switching type may be obtained by utilizing the location of the read/write head to determine the zone, and indexing into the stored table using the zone.

FIG. 6 is a flow diagram illustrating in more detail the method steps in a head switch test (such as the head switch test 504 in FIG. 5). Control initially transfers to a start operation 600 wherein initialization processing occurs. Control then transfers to a selecting operation 601 wherein two tracks are selected within the selected zone (from the selecting operation 501): an origin track and a destination track. Control then transfers to a moving operation 602 wherein a selected head, such as head zero, is moved to the origin track that was selected in selecting operation 601. Control then transfers to a performing operation 604 wherein a head switch operation is performed. The head switch operation 604 involves switching to another head, such as head one, in the disc drive and positioning head one on the destination track. The performing operation 604 can be accomplished by the host 200 issuing a command to the disc drive instructing the disc drive to switch to the other head and position the other head over the destination track. Alternatively, the performing operation 604 can be accomplished by the microprocessor 216 issuing a command to the servo controller 228 instructing the servo controller 228 to switch to the other head and position the other head over the destination track (e.g., 160). Positioning the head on the destination track may involve a short seek operation as well as the actual head switch. For head switching, the destination track is typically the next track on the same cylinder as the origin track (cylinder). For example, a head switch operation may involve switching from cylinder 0, head 0 (origin track (e.g., track 414)) to cylinder 0, head 1 (destination track (e.g., track 416)).

Also in the performing operation 604, a timer is preferably started upon the issuance of the head switch command. The timer begins counting the time it takes for the head one to settle on the destination track. Control then transfers to a measuring operation 606 wherein a head switch time duration is measured. As was described, a head switch time duration is preferably the amount of time between the issuance of a head switch command and the time when the selected head settles on the destination track. Control then transfers to a storing operation 608 wherein the head switch time duration is stored in a memory location. Memory includes random access memory (RAM), electrically erasable programmable ROM (EEPROM), or any other memory medium known in the art. After the head switch time duration is stored, control transfers to a query operation 609 wherein it is determined whether the last pair of origin/destination tracks in the selected zone has been tested. If not, control transfers back to the selecting operation 601. The selecting operation 601 selects the next pair of origin/destination tracks to test. If the last pair has been tested, control transfers to an averaging operation 610, which averages the stored head switch time durations.

In the averaging operation 610 the stored head switch time durations (from the storing operation 608) are averaged to yield a number representing an average head switch time duration. The average head switch time duration is compared to an average track switch time duration to determine whether head switch operations or track switch operations are faster within the selected zone. Control then transfers to a calculating operation 612 wherein a head skew value is determined and included in the head switch analysis. The average head switch time duration may be used to calculate the head skew value in the calculating operation 612. The head skew value can be used to improve disc drive performance by providing an offset from the true start sector after each head switch operation so that the read/write heads can land at a position very close to the first logical sector after a head switch. Control then transfers to a return operation 614 wherein control is transferred to the calling routine.

FIG. 7 is a flow diagram illustrating the operational steps in performing a track switch test (such as the track seek test 506 of FIG. 5) for adaptive head switch sequencing in accordance with an embodiment of the present invention. Control initially transfers to a start operation 700 wherein initialization processing occurs. Control then transfers to a selecting operating 701 wherein an origin track and a destination track are selected. The origin track may correspond to the origin track selected in the head switch test 504 at selecting step 601. The destination track is preferably a track adjacent the origin track. During the track seek operation, one of the heads will be used to switch from the origin track to the destination track on the same surface of the disc.

Control then transfers to a moving operation 702 wherein an associated head, such as head zero, is positioned over the origin track. Control then transfers to a performing operation 704 wherein a track seek operation is performed. The track seek operation 704 involves moving one of the heads, such as head 0, from the origin track (or cylinder) to the destination track (or cylinder). For example, the track seek operation 704 may involve a switch from cylinder 0, head 0 to cylinder 1, head 0. Control then transfers to a measuring operation 706 wherein a track switch time duration is measured. The track switch time duration is typically the time lapse between the beginning of the performing operation 704 until head zero settles on the destination track. Control then transfers to a storing operation 708 wherein the track switch time duration is stored in memory. After the track switch time duration is stored, control transfers to a query operation 709, which asks whether the last pair of origin/destination tracks in the selected zone has been tested. If not, control transfers back to the selecting operation 701. The selecting operation 701 selects the next pair of origin/destination tracks to test. If the last pair has been tested, control transfers to an averaging operation 710 that averages the stored track switch time durations.

In the averaging operation 710 the stored track switch time durations (from storing operation 708) are averaged to yield a number representing an average track switch time duration. As will be discussed, the average track seek time duration is compared to an average head switch time duration to determine whether head switch operations or track seek operations are faster within a zone. Control then transfers to a calculating operation 712 wherein a cylinder skew value is calculated to facilitate the switching analysis. The average track switch time duration may be used to calculate the cylinder skew value in the calculating operation 712. The cylinder skew value can be used to improve disc drive performance by providing an offset from the true start sector after each track seek operation so that the read/write heads can land close to the first logical sector after a track seek. Control then transfers to a return operation 714 wherein control is transferred back to a calling routine.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

To summarize, one embodiment may be viewed as a method of adapting a switching sequence in a disc drive (such as 100) by selecting (such as 501) a zone (such as 170) on a surface of the data disc (such as 108), measuring (such as 606) the time it takes to perform a head switch operation within the selected zone (such as 170), and measuring (such as 706) the time it takes to perform a track switch operation within the selected zone (such as 170). The method further includes comparing (such as 508) the track switch time duration to the head switch time duration. If the track switch time duration is greater than the head switch time duration, the switch type is set (such as 502) to head switching within the selected zone (such as 170); otherwise the switch type is set (such as 512) to track switching in the selected zone (such as 170).

Another embodiment may involve storing (such as 608, 708) the head switch time duration and the track switch time duration in memory. The selecting, measuring, and storing steps (such as 501, 606, 706, 508, 608, and 708) may be repeated for a plurality of first and second tracks (such as 160) in the selected zone (such as 170). The stored head switch time durations and track switch time durations are averaged (such as 610 and 710). The head switch time average is compared (such as 508) to the average track switch time duration. If the average track switch time duration is greater than the average head switch time duration, the switch type is set (such as 502) to head switching within the selected zone (such as 170); otherwise the switch type is set (such as 512) track switching in the selected zone (such as 170).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, other algorithms could be employed to analyze the timing data to determine faster switching schemes within zones on the data discs. Numerous other changes may be made which will readily suggest themselves to those skilled in the art and which are encompassed in the spirit of the invention disclosed and as defined in the appended claims.

What is claimed is:

1. In a disc drive having a data disc with a top surface and a bottom surface for recording data, each of the surfaces comprising a plurality of zones each having a plurality of tracks, the disc drive having a first head positioned adjacent the top surface and a second head positioned adjacent the bottom surface for reading and writing data from and to the tracks on the data disc, a method of adapting a switching sequence to the disc drive comprising steps of:

(a) selecting a zone on one of the surfaces of the data disc;
   (b) measuring a head switch time duration representing the time it takes for the first head at a first track to switch to the second head at a second track within the selected zone;
   (c) measuring a track switch time duration representing the time it takes for the first head to perform a track seek operation from the first track to the second track within the selected zone;
   (d) comparing the track switch time duration to the head switch time duration; and
   (e) if the track switch time duration is greater than the head switch time duration, utilizing head switching for subsequent operation within the selected zone; otherwise utilizing track switching in the selected zone.

2. The method according to claim 1 wherein the measuring step (b) comprises steps of:

(b)(i) determining a first time value when a command is issued to switch from the first head at the first track to the second head at the second track;
   (b)(ii) determining a second time value when the second head settles on the second track; and
   (b)(iii) calculating a difference between the first time value and the second time value to determine the head switch time duration.

3. The method of claim 1 further comprising steps of:

(f) storing the head switch time duration and the track switch time duration.

4. The method according to claim 3 further comprising steps of:

(g) repeating steps (a) through (d) for a plurality of first and second tracks in the selected zone to generate an associated plurality of head switch time durations and an associated plurality of track switch time durations;
   (h) storing the head switch time duration and the track switch time duration;
   (i) averaging the plurality of head switch time durations to generate an average head switch time duration value;
   (j) averaging the plurality of track switch time durations to generate an average track switch time duration value;
   (k) comparing the average head switch time duration value to the average track switch time duration value; and
   (l) if the average track switch time duration value is greater than the average head switch time duration value, utilizing head switching within the selected zone; otherwise utilizing track switching in the selected zone.

5. The method according to claim 3 further comprising steps of:

(f) repeating steps (a) through (e) for each of the zones on the data disc.

6. The method according to claim 4 further comprising repeating steps (a) through (l) for each zone on the data disc.

7. A method of adapting switching within zones on a data disc in a disc drive having a first head and a second head positioned adjacent the data disc for reading and writing data from and to tracks on the data disc, the method comprising steps of:

(a) aligning the first head over a first track within a selected zone;

(b) issuing a head switch command to the disc drive to access a second track in the selected zone with the second head;

(c) measuring a head switch time duration between issuance of the head switch command and when the second head settles on the second track;

(d) issuing a track switch command to access another track with the first head;

(e) measuring a track seek time duration between issuance of the track switch command is and when the first head settles on the another track;

(f) comparing the head switch time duration to the track seek time duration; and (g) if the head switch time duration is less than the track switch time duration, utilizing head switching within the selected zone to access tracks on the data disc; and (h) if the head switch time duration is greater than the track seek time duration, utilizing track switching within the selected zone to access tracks on the data disc.

8. The method according to claim 7 further comprising steps of:

(i) storing the head switch time duration;

(j) storing the track seek time duration; and (k) repeating steps (a) through (j) for each track on the data disc; and (l) calculating an average head switch time duration for a group of tracks;

(m) calculating an average track seek time duration for the group of tracks;

(n) comparing the average head switch time duration to the average track seek time duration; and (o) utilizing head switching within the selected zone if the average head switch time duration is not greater than the average track seek time duration.

9. The method of claim 8 further comprising calculating a cylinder skew value for adjusting the head position.

10. The method of claim 8 further comprising calculating a head skew value for adjusting the position of a head.

11. The method of claim 8 further comprising repeating steps (a) through (h) for each zone on the data disc.

12. A disc drive system having a data disc rotatably mounted to a hub, the data disc having one or more zones, each zone having a plurality of data tracks, the disc drive system comprising:

an actuator assembly adjacent the data disc having an actuator arm carrying a transducer over surfaces of the data disc for reading data from and writing data to the data disc; and a switching sequence adaptation means for selecting a switching sequence in the disc drive system in response to comparing a head switch time duration within a selected zone to a track switch time duration within the selected zone.

13. The disc drive system of claim 12 wherein the switching sequence adaptation means selects head switching in a selected zone if the head switch time duration is less than the track switch time duration.

14. The switching sequence adaptation system of claim 12 wherein the switching sequence adaptation means comprises computer executable instructions executed by a host computer connected to the disc drive.

15. The switching sequence adaptation system of claim 14 wherein the switching sequence adaptation means comprises a comparison module operable to compare the head switch time duration to the track switch time duration to determine whether to utilize head switching or track switching in the selected zone.

16. The switching sequence adaptation system of claim 14 wherein the switching sequence adaptation means comprises a head switch averaging module operable to average a plurality of head switch time durations and a track switch averaging module operable to average a plurality of track switch time durations to determine whether to utilize head switching or track switching in the selected zone.

* * * * *